(12) United States Patent
Zhang

(10) Patent No.: US 10,250,157 B2
(45) Date of Patent: *Apr. 2, 2019

(54) SYNCHRONOUS RECTIFICATION CIRCUIT AND SWITCHING POWER SUPPLY THEREOF

(71) Applicant: Silergy Semiconductor Technology (Hangzhou) Ltd., Hangzhou (CN)

(72) Inventor: Lingdong Zhang, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,709

(22) Filed: Jul. 3, 2017

(65) Prior Publication Data

US 2017/0302194 A1 Oct. 19, 2017

Related U.S. Application Data

(63) Continuation-in-part of application No. 14/521,825, filed on Oct. 23, 2014, now Pat. No. 9,712,078.

(30) Foreign Application Priority Data

Oct. 25, 2013 (CN) .......................... 2013 1 0514284

(51) Int. Cl.
*H02M 7/219* (2006.01)
*H02M 1/08* (2006.01)
(Continued)

(52) U.S. Cl.
CPC ............. *H02M 7/219* (2013.01); *H02M 1/08* (2013.01); *H02M 1/38* (2013.01);
(Continued)

(58) Field of Classification Search
CPC ............ H02M 7/00; H02M 7/02; H02M 7/04; H02M 7/12; H02M 7/21; H02M 7/217;
(Continued)

(56) References Cited

U.S. PATENT DOCUMENTS

| 6,327,164 | B1 | 12/2001 | Shinkawa |
| 7,764,527 | B2 | 7/2010 | Takayanagi |

(Continued)

FOREIGN PATENT DOCUMENTS

| CN | 1897436 A | 1/2007 |
| CN | 103199717 A | 7/2013 |
| CN | 103208920 A | 7/2013 |
| CN | 103236795 A | 8/2013 |
| CN | 103269163 A | 8/2013 |

OTHER PUBLICATIONS

Office Action or Chinese Patent Application No. 201310514284.1, dated Apr. 29, 2015, 6 pages.

(Continued)

*Primary Examiner* — Alex Torres-Rivera
*Assistant Examiner* — Carlos O Rivera-Perez
(74) *Attorney, Agent, or Firm* — Westman, Champlin & Koehler, P.A.

(57) ABSTRACT

The present disclosure relates to a synchronous rectification circuit. Operation states of four transistor switches in the synchronous rectification circuit are adjusted in accordance with a detected input voltage signal of the synchronous rectification circuit to achieve synchronous rectification. Moreover, the transistor switches in a rectifier bridge and a switching control circuit are all integrated into a single chip to have an increased integration level, a reduced chip size, and high efficiency. The present disclosure also relates to a switching power supply comprising the above synchronous rectification circuit.

9 Claims, 3 Drawing Sheets

(51) Int. Cl.
*H02M 1/00* (2006.01)
*H02M 1/38* (2007.01)

(52) U.S. Cl.
CPC ............... *H02M 2001/0048* (2013.01); *H02M 2007/2195* (2013.01); *Y02B 70/1408* (2013.01); *Y02B 70/1491* (2013.01)

(58) Field of Classification Search
CPC ...... H02M 7/2176; H02M 7/219; H02M 1/38; H02M 1/385; H02M 1/08; H02M 1/083; H02M 1/084; H02M 1/0845; H02M 1/088; H02M 2001/0048; H02M 2001/0054; H02M 2001/0058; H02M 2007/2195; H02M 3/33569; H02M 3/33576; H02M 3/33592; Y02B 70/1408; Y02B 70/1441; Y02B 70/1458; Y02B 70/1475; Y02B 70/1466; Y02B 70/1491
USPC ........ 363/15–17, 21.02, 21.03, 21.06, 21.14, 363/37, 44–48, 65, 67–70, 81, 82, 84, 88, 363/89, 123–127, 147; 323/205–211, 323/222–226, 271–275, 281–287, 323/299–303, 351
See application file for complete search history.

(56) References Cited

U.S. PATENT DOCUMENTS

| 9,712,078 | B2* | 7/2017 | Zhang | .................. H02M 7/219 |
| 2007/0236198 | A1 | 10/2007 | Kawagoe et al. | |
| 2007/0263421 | A1* | 11/2007 | Kyono | ............. H02M 3/33592 363/127 |
| 2009/0016090 | A1* | 1/2009 | Knight | ............. H02M 3/33592 363/127 |
| 2009/0273951 | A1* | 11/2009 | Ren | .................. H02M 3/33592 363/21.06 |
| 2012/0242311 | A1 | 9/2012 | Terry et al. | |
| 2013/0176758 | A1 | 7/2013 | Tseng et al. | |

OTHER PUBLICATIONS

USPTO issued prosecution for U.S. Appl. No. 14/521,825, filed Oct. 23, 2014, including: Notice of Allowance dated Mar. 20, 2017, 7 pages; Advisory Action dated Feb. 1, 2017, 4 pages; Final Rejection dated Oct. 26, 2016, 9 pages; Non-Final Rejection dated Apr. 12, 2016, 10 pages; 30 total pages.

* cited by examiner

SYNCHRONOUS RECTIFICATION CIRCUIT AND SWITCHING POWER SUPPLY THEREOF

CROSS-REFERENCE TO RELATED APPLICATION

This application is a continuation-in-part of U.S. application Ser. No. 14/521,825, filed on Oct. 23, 2014, which claims the benefit of Chinese Patent Application No. 201310514284.1, filed on Oct. 25, 2013, the contents of which are incorporated herein by reference in their entirety.

TECHNICAL FIELD

The present disclosure generally relates to the field of power electronics, and more particularly, to a synchronous rectification circuit adapted to an electronic transformer and a switching power supply thereof.

BACKGROUND

In a conventional switching power supply, an AC input voltage is typically rectified by a rectifier bridge, such as a full bridge or a half bridge. FIG. 1 illustrates a schematic diagram of a rectifier bridge used in a switching power supply. The rectifier bridge, for example, a full bridge, includes four diodes D1, D2, D3 and D4 which are connected with each other as an electrical bridge and packaged as a chip. In a rectification cycle, the diodes D1 and D4 conduct during a positive half sine wave, and the diodes D2 and D3 conduct during a negative half sine wave. Due to forward conduction characteristics of the diodes, an AC input voltage of the switching power supply is converted into a pulsed DC output voltage which is supplied to the subsequent power stage 103.

Although the rectifier bridge has a low cost, it has a large size and causes a power loss which in turn decreases power efficiency.

SUMMARY

One object of the present disclosure is to provide a synchronous rectifier scheme which is adapted to an electronic transformer and uses synchronous rectification switching transistors instead of rectifier diodes. A switching control circuit controls operation states of the synchronous rectification switching transistors in accordance with an output voltage signal of the electronic transformer to achieve the synchronous rectification.

According to one aspect of the present disclosure, there is provided a synchronous rectification circuit, comprising: a rectifier bridge having a first transistor switch, a second transistor switch, a third transistor switch and a fourth transistor switch; and a switching control circuit configured to generate a first switching signal, a second switching signal, a third switching signal and a fourth switching signal for the first transistor switch, the second transistor switch, the third transistor switch and the fourth transistor switch respectively, wherein at least one of the first switching signal and the third switching signal is generated from the second switching signal and the fourth switching signal.

Preferably, the rectifier bridge receives an input voltage between a first input terminal, which is a common node between the third transistor switch and the fourth transistor switch, and a second input terminal, which is a common node between the first transistor switch and the second transistor switch, and provides an output voltage between a first output terminal and a second output terminal.

Preferably, the first transistor switch and the second transistor switch are connected in series between the first output terminal and the second output terminal, and the third transistor switch and the fourth transistor are connected in series between the first output terminal and the second output terminal.

Preferably, the second switching signal is generated in accordance with a second voltage at the second input terminal, and the fourth switching signal is generated in accordance with a first voltage at the first input terminal.

Preferably, the switching control circuit comprises a first switching control circuit, a second switching control circuit, a third switching control circuit, and a fourth switching control circuit for generating the first switching signal, the second switching signal, the third switching signal and the fourth switching signal respectively.

Preferably, the second switching control circuit generates a second on signal for turning on the second transistor switch and a second off signal for turning off the second transistor switch, as the second switching signal, and the fourth switching control circuit generates a fourth on signal for turning on the fourth transistor switch and a fourth off signal for turning off the fourth transistor switch, as the fourth switching signal.

Preferably, the second switching control circuit comprises a first voltage judgment circuit and a second logic circuit, in which the first voltage judgment circuit receives the second voltage, compares the second voltage with a first threshold voltage and a second threshold voltage respectively, and generates a first comparison signal and a second comparison signal, the second logic circuit receives the first comparison signal, the second comparison signal and a dead time signal, generates the second on signal in a case that the second voltage is less than the first threshold voltage and the dead time signal is active, and the second off signal in a case that the second voltage is larger than the second threshold voltage; the fourth switching control circuit comprises a second voltage judgment circuit and a fourth logic circuit, in which the second voltage judgment circuit receives the first voltage, compares the first voltage with a third threshold voltage and a fourth threshold voltage respectively, and generates a third comparison signal and a fourth comparison signal, and the fourth logic circuit receives the third comparison signal, the fourth comparison signal and the dead time signal, generates the fourth on signal in a case that the first voltage is less than the third threshold voltage and the dead time signal is active, and the fourth off signal in a case that the first voltage is larger than the fourth threshold voltage.

Preferably, the first switching control circuit generates a first on signal for turning on the first transistor switch and a first off signal for turning off the first transistor switch, as the first switching signal, and the third switching control circuit generates a third on signal for turning on the third transistor switch and a third off signal for turning off the third transistor switch, as the third switching signal.

Preferably, the first switching control circuit comprises a first logic circuit, the first logic circuit receives the second off signal and the fourth on signal, performs an AND operation, and generates the first on signal; and the first logic circuit receives the second on signal and the fourth off signal, performs an OR operation, and generates the first off signal; the third switching control circuit comprises a third logic circuit, the third logic circuit receives the second on signal and the fourth off signal, performs an AND operation, and generates the third on signal; the third logic circuit receives the second off signal and the fourth on signal, performs an OR operation, and generates the third off signal.

Preferably, the dead time signal represents a time interval during which both the second transistor switch and the fourth transistor switch are inactive.

Preferably, the first to fourth transistor switches and the switching control circuit are integrated into a single integrated chip.

Preferably, the integrated chip comprises four pins for being coupled to peripheral circuits, including two input pins and two output pins.

According to another aspect of the present disclosure, there is provided a switching power supply, comprising a power stage, a driving control circuit, and any of the above synchronous rectification circuits.

In the above synchronous rectification circuit, operation states of the four transistor switches are adjusted in accordance with an input voltage signal of the synchronous rectification circuit to achieve synchronous rectification. At least one of the first transistor switch and the third transistor switch is controlled based on operations states of the second and fourth transistor switches. Thus, the switching control circuit can have a simplified structure and reliable synchronous rectification effect.

Moreover, the transistor switches in the rectifier bridge and the switching control circuit may all be integrated into a single chip to have an increased integration level, a reduced chip size, and high efficiency.

DESCRIPTION OF EMBODIMENTS

Reference will now be made in detail to particular embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents that may be included within the spirit and scope of the disclosure as defined by the appended claims. Furthermore, in the following detailed description of the present disclosure, numerous specific details are set forth in order to provide a thorough understanding of the present disclosure. However, it will be readily apparent to one skilled in the art that the present disclosure may be practiced without these specific details.

Figure 1:
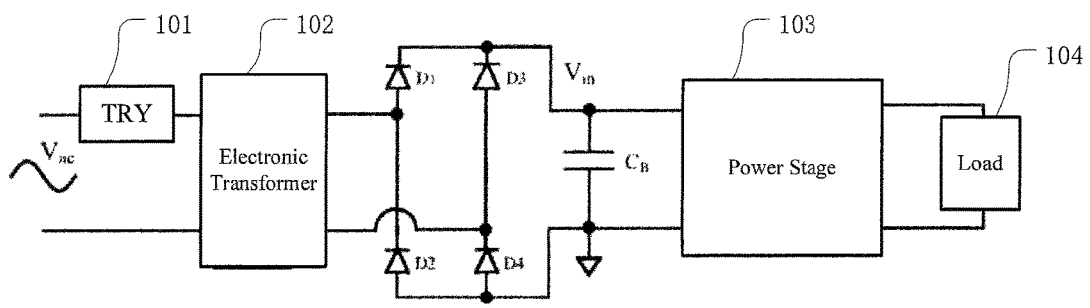
FIG. 1 is a schematic diagram showing a basic configuration of a rectifier bridge used in a switching power supply according to the prior art.
Figure 2:
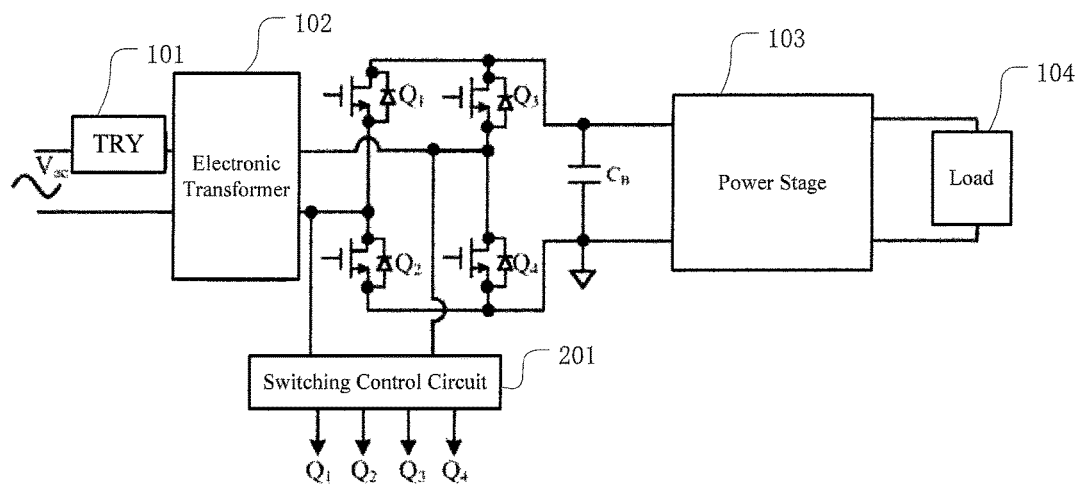
FIG. 2 is a schematic diagram showing an example synchronous rectification circuit adapted to an electronic transformer according to the present disclosure.

Referring now to FIG. 2, a schematic diagram of an example synchronous rectification circuit adapted to an electronic transformer 102 according to the present disclosure is shown. In this embodiment, an external AC power supply is processed by a thyristor 101 and an electronic transformer 102 and is converted into a voltage signal having a sine wave envelope. The voltage signal is then supplied to a synchronous rectification circuit. The synchronous rectification circuit includes a first transistor switch Q1 and a second transistor switch Q2 which are connected in series between a first output terminal and a second output terminal, and a third transistor switch Q3 and a fourth transistor switch Q4 which are connected in series between the first output terminal and the second output terminal. The first transistor switch Q1, the second transistor switch Q2, the third transistor switch Q3 and a fourth transistor switch Q4 are configured to be a rectifier bridge. The first transistor switch Q1 and the fourth transistor switch Q4 constitute a first half bridge, and the second transistor switch Q2 and the third transistor switch Q3 constitute a second half bridge. For example, all of the four transistor switches are N-type MOS transistors. The synchronous rectification circuit further includes a switching control circuit 201. An AC input voltage of the switching power supply is converted into a pulsed DC output voltage by four transistor switches, and is then supplied to a subsequent power stage 103 for driving a load 104.

Here, a common node between the third transistor switch Q3 and the fourth transistor switch Q4 is a first input terminal L of the synchronous rectification circuit, and a common node between the first transistor switch Q1 and the second transistor switch Q2 is a second input terminal N of the synchronous rectification circuit. The first and second input terminals receive the input voltage signal from the electronic transformer 102. Moreover, a common node between the first transistor switch Q1 and the third transistor switch Q3 is a first output terminal Vout of the synchronous rectification circuit, and a common node between the second transistor switch Q2 and the fourth transistor switch Q4 is a second output terminal GND of the synchronous rectification circuit.

The switching control circuit 201 controls operation states of the four transistor switches in accordance with voltages at the first and second input terminals. Specifically, the switching control circuit 201 includes a first switching control circuit 201-1, a second switching control circuit 201-2, a third switching control circuit 201-3 and a fourth switching control circuit 201-4, for controlling switching operations of the first transistor switch Q1, the second transistor switch Q2, the third transistor switch Q3 and the fourth transistor switch Q4 respectively.

Figure 3:
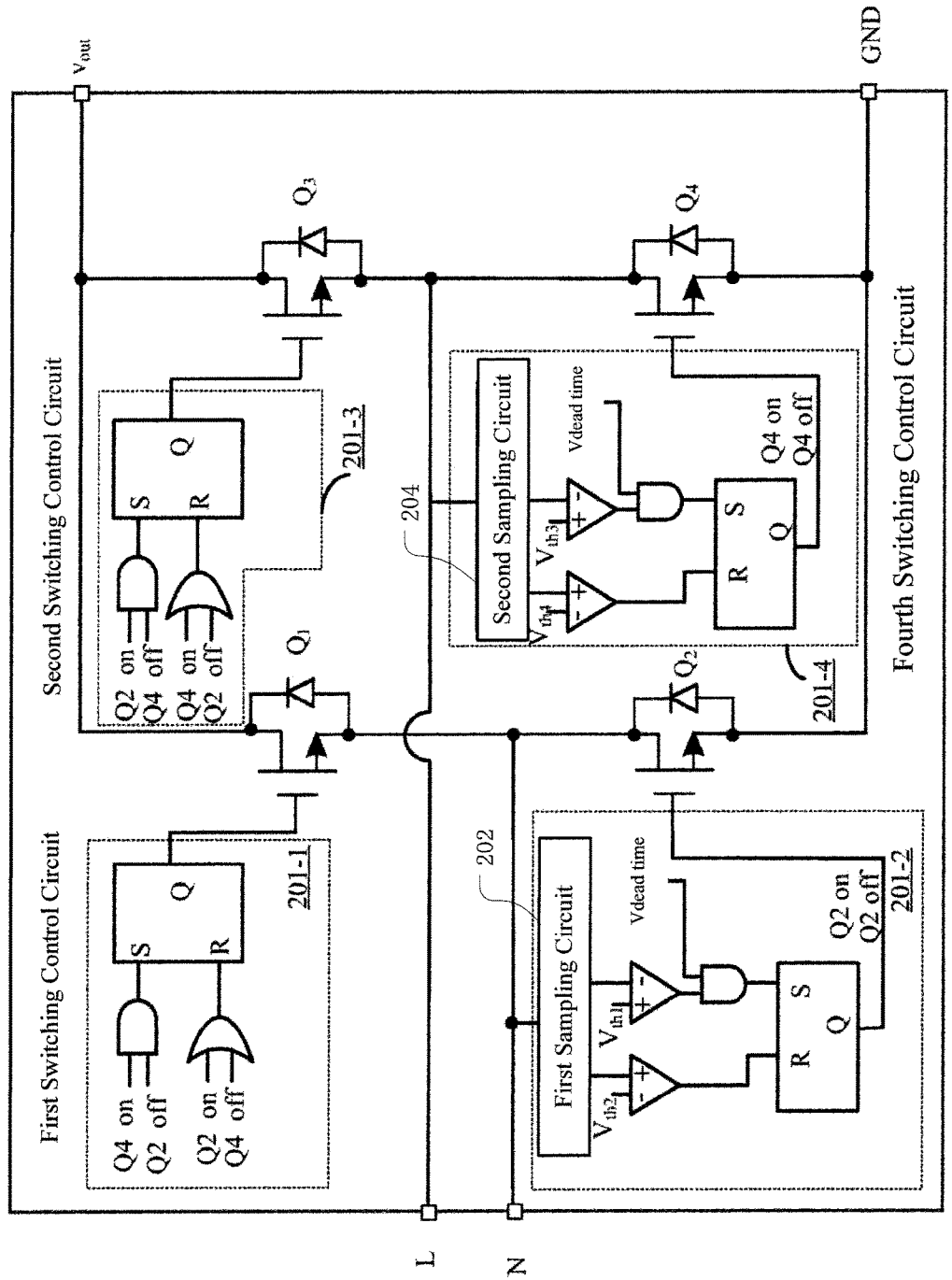
FIG. 3 is a schematic diagram showing details of the switching control circuit in FIG. 2.

FIG. 3 is a schematic diagram showing details of the switching control circuit 201. The switching control circuit 201 comprises a first switching control circuit 201-1, a second switching control circuit 201-2, a third switching control circuit 201-3, and a fourth switching control circuit 201-4 for generating a first switching signal, a second switching signal, a third switching signal and a fourth switching signal respectively, for controlling on and off states of the first transistor switch Q1, the second transistor switch Q2, the third transistor switch Q3 and a fourth transistor switch Q4 respectively.

The second switching control circuit 201-2 includes a first voltage judgment circuit and a second logic circuit. The first voltage judgment circuit receives a voltage $V_N$ at the second input terminal, compares the voltage $V_N$ with a first threshold voltage $V_{th1}$ and a second threshold voltage $V_{th2}$ respectively, and generates a first comparison signal and a second comparison signal. Here, the first threshold voltage $V_{th1}$ is less than zero. Preferably, the first threshold voltage $V_{th1}$ in this embodiment is −30 mV. The second threshold voltage $V_{th2}$ is larger than zero. Preferably, the second threshold voltage $V_{th2}$ in this embodiment is 10 mV.

The second logic circuit receives the first comparison signal, the second comparison signal and a dead time signal $V_{dead\ time}$, generates a second on signal $S_{Q2\text{-}on}$ for turning on the second transistor switch in a case that the voltage at the second input terminal is less than the first threshold voltage and the dead time signal $V_{dead\ time}$ is active, and a second off signal $S_{Q2\text{-}off}$ for turning off the second transistor switch in a case that the voltage at the second input terminal is larger than the second threshold voltage. The dead time signal $V_{dead\ time}$ represents a time interval during which both the second transistor switch and the fourth transistor switch are inactive.

Specifically, the first voltage judgment circuit in this embodiment includes a first sampling circuit 202, a first comparator and a second comparator, and the second logic circuit includes a first AND circuit and a second flip-flop. The second switching control circuit may be other circuits having the same function.

The fourth switching control circuit 201-4 includes a second voltage judgment circuit and a fourth logic circuit. The second voltage judgment circuit receives a voltage $V_L$ at the first input terminal, compares the voltage $V_L$ with a third threshold voltage $V_{th3}$ and a fourth threshold voltage $V_{th4}$ respectively, and generates a third comparison signal and a fourth comparison signal. The fourth logic circuit receives the third comparison signal, the fourth comparison signal and a dead time signal $V_{dead\ time}$, generates a fourth on signal $S_{Q4\text{-}on}$ for turning on the fourth transistor switch in a case that the voltage at the first input terminal is less than the third threshold voltage and the dead time signal $V_{dead\ time}$ is active, and a fourth off signal $S_{Q4\text{-}off}$ for turning off the fourth transistor switch in a case that the voltage at the first input terminal is larger than the fourth threshold voltage. Similarly, the third threshold voltage $V_{th3}$ is less than zero. Preferably, the third threshold voltage $V_{th3}$ in this embodiment is −30 mV. The fourth threshold voltage $V_{th4}$ is larger than zero. Preferably, the fourth threshold voltage $V_{th4}$ in this embodiment is 10 mV.

Specifically, the second voltage judgment circuit in this embodiment includes a second sampling circuit 204, a third comparator and a fourth comparator, and the fourth logic circuit includes a second AND circuit and a fourth flip-flop. The fourth switching control circuit may be other circuits having the same function.

The first switching control circuit 201-1 includes a first logic circuit. The first logic circuit receives the second off signal $S_{Q2\text{-}off}$ and the fourth on signal $S_{Q4\text{-}on}$, performs an AND operation, and generates a first on signal $S_{Q1\text{-}on}$ for turning on the first transistor switch. The first logic circuit receives the second on signal $S_{Q2\text{-}on}$ and the fourth off signal $S_{Q4\text{-}off}$, performs an OR operation, and generates a first off signal $S_{Q1\text{-}off}$ for turning off the first transistor switch.

Specifically, the first logical circuit includes a third AND gate, a first OR gate and a first flip-flop. The first switching control circuit may be other circuits having the same function.

The third switching control circuit 201-3 includes a third logic circuit. The third logic circuit receives the second on signal $S_{Q2\text{-}on}$ and the fourth off signal $S_{Q4\text{-}off}$, performs an AND operation, and generates a third on signal $S_{Q3\text{-}on}$ for turning on the third transistor switch. The third logic circuit receives the second off signal $S_{Q2\text{-}off}$ and the fourth on signal $S_{Q4\text{-}on}$, performs an OR operation, and generates a third off signal $S_{Q3\text{-}off}$ for turning off the third transistor switch.

Specifically, the third logical circuit includes a fourth AND gate, a second OR gate and a third flip-flop. The third switching control circuit may be other circuits having the same function.

Figure 4:
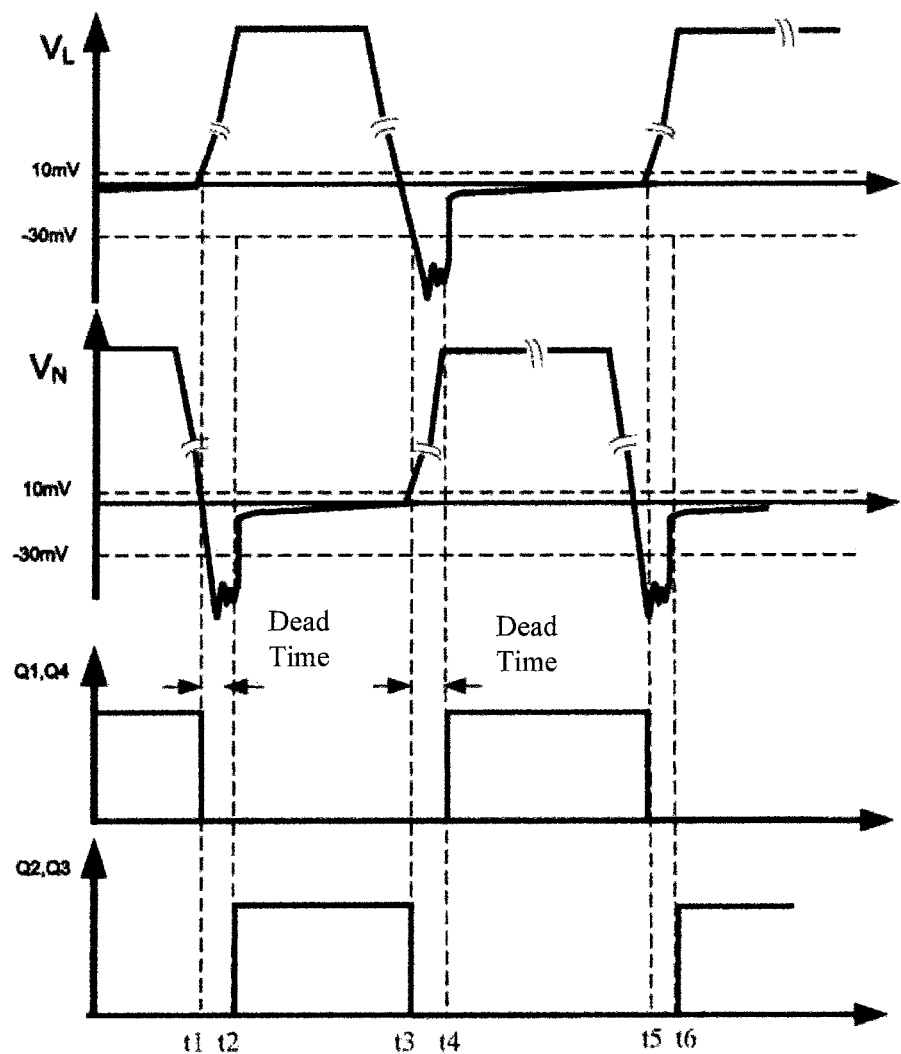
FIG. 4 is a waveform diagram showing example operations of the synchronous rectification circuit according to the present disclosure.

Operations of the synchronous rectification circuit in this embodiment will be described below, in combination with a waveform diagram in FIG. 4, showing example operations of the synchronous rectification circuit according to the present disclosure, and the above schematic diagram showing details of the synchronous rectification circuit.

In FIG. 4, the waveform $V_L$ is a voltage waveform at the first input terminal, and the waveform $V_N$ is a voltage waveform at the second input terminal. At time t1, the voltage $V_L$ at the input terminal L increases. Body diodes of the second and third transistor switches conduct when a voltage drop between the voltage $V_L$ and the voltage $V_N$ is larger than a sum of conduction voltage drops of the body diodes of the second and third transistor switches. Meanwhile, the second transistor switch Q2 has a negative drain to source voltage. It should be noted that the voltage $V_N$ is the drain to source voltage of the second transistor switch Q2. When the first voltage judgment circuit detects that the voltage $V_N$ is less than the first threshold voltage $V_{th1}$, the first comparison signal is inverted to a high level. The second switching control circuit 201-2 turns on the second transistor switch Q2 until time t2, during which the dead time signal $V_{dead\ time}$ is active. Meanwhile, the fourth transistor switch Q4 is in an off state, and the third switching control circuit 201-3 turns on the third transistor switch Q3. At time t3, when the first voltage judgment circuit detects that the voltage $V_N$ is larger than the second threshold voltage $V_{th2}$, the second comparison signal is inverted to a high level. The second switching control circuit 201-2 turns off the second transistor switch Q2. Meanwhile, the third switching control circuit 201-3 turns off the third transistor switch Q3. Consequently, a first half sine wave is outputted at the output terminal of the synchronous rectification circuit.

At time t3, the voltage $V_N$ at the input terminal N then increases. Body diodes of the fourth and first transistor switches is turned on when a voltage drop between the voltage $V_N$ and the voltage $V_L$ is larger than a sum of conduction voltage drops of the body diodes of the fourth and first transistor switches. Meanwhile, the fourth transistor switch Q4 has a negative drain to source voltage. It should be noted that the voltage $V_L$ is the drain to source voltage of the fourth transistor switch. When the second voltage judgment circuit detects that the voltage $V_L$ is less than the third threshold voltage $V_{th3}$, the third comparison signal is inverted to a high level. The fourth switching control circuit 201-4 turns on the fourth transistor switch Q4 until time t4, during which the dead time signal $V_{dead\ time}$ is active. Meanwhile, the second transistor switch Q2 is in an off state, and the first switching control circuit 201-1 turns on the first transistor switch Q1. At time t5, when the second voltage judgment circuit detects that the voltage $V_L$ is larger than the second threshold voltage $V_{th2}$, the fourth comparison signal is inverted to a high level. The fourth switching control circuit 201-4 turns off the fourth transistor switch Q4. Meanwhile, the first switching control circuit 201-1 turns off the first transistor switch Q1. Consequently, a second half sine wave is outputted at the output terminal of the synchronous rectification circuit.

The AC output voltage from the electronic transformer 102 is rectified by the above synchronous rectification circuit to obtain a pulsed DC output voltage. Here, the first to fourth transistor switches Q1-Q4 and the switching control circuit 201 may be integrated into a single integrated chip. It should be noted that a bootstrap capacitor may be arranged outside the chip for each of the first transistor switch Q1 and the third transistor switch Q3 so that a voltage drop is applied as required between a gate and a source of the respective transistor switch. In an actual circuit operation, a gate driver may be arranged for each of the first transistor switch Q1 and the third transistor switch Q3 so that a gate to source voltage of the respective transistor switch can reach a conduction threshold voltage.

As discussed above, the synchronous rectification circuit according to the present disclosure converts an AC input voltage to a DC output voltage by four transistor switches. The control circuit is simple and has high efficiency. The chip size is also reduced by integrating more electronic devices in a single integrated chip. In the embodiments of the present disclosure, various electronic devices of the synchronous rectification circuit are encapsulated in a single semiconductor chip. The integrated chip has four pins for being coupled to peripheral circuits, including two input pins and two output pins. The two input pins correspond to the first and second input terminals of the synchronous rectification circuit, and two output pins correspond to the first and second output terminals of the synchronous rectification circuit. Compared with the conventional rectifier bridge using four diodes, the synchronous rectification circuit decreases the size of the rectification bridge and the number of the pins. The synchronous rectification circuit according to the present disclosure is used for rectifying a voltage signal having a sine wave envelope from an electronic transformer 102, but not limited to this.

According to another aspect of the present disclosure, there is provided a switching power supply, comprising a power stage, a driving control circuit, and the above synchronous rectification circuits. Similarly, the switching power supply advantageously has high efficiency and a reduced size.

The synchronous rectification circuit adapted to the electronic transformer according to the present disclosure has been described in detail for the preferable embodiments. It is apparent for one skilled person that other technique or configuration or circuits or electronic devices, if being equivalents, can also be used in these embodiments.

Although various embodiments of the present disclosure are described above, these embodiments neither present all details, nor imply that the present disclosure is limited to these embodiments. Obviously, many modifications and changes may be made in light of the teaching of the above embodiments. These embodiments are presented and some details are described herein only for explaining the principle of the disclosure and its actual use, so that one skilled person can practice the present disclosure and introduce some modifications in light of the disclosure. The disclosure is intended to cover alternatives, modifications and equivalents that may be included within the spirit and scope of the disclosure as defined by the appended claims.

What is claimed is:

1. A synchronous rectification circuit, comprising:
   a rectifier bridge having a first transistor switch, a second transistor switch, a third transistor switch and a fourth transistor switch; and
   a switching control circuit configured to generate a first switching signal, a second switching signal, a third switching signal and a fourth switching signal for said first transistor switch, said second transistor switch, said third transistor switch and said fourth transistor switch respectively,
   wherein said first switching signal and said third switching signal are different signals, and at least one of said first switching signal and said third switching signal is generated from both of said second switching signal and said fourth switching signal,
   wherein said rectifier bridge receives an input voltage between a first input terminal, which is a common node between said third transistor switch and said fourth transistor switch, and a second input terminal, which is a common node between said first transistor switch and said second transistor switch, and provides an output voltage between a first output terminal and a second output terminal,
   wherein said switching control circuit comprises a first switching control circuit, a second switching control circuit, a third switching control circuit, and a fourth switching control circuit for generating said first switching signal, said second switching signal, said third switching signal and said fourth switching signal respectively,
   wherein said second switching control circuit generates a second on signal for turning on said second transistor switch and a second off signal for turning off said second transistor switch, as said second switching signal, and said fourth switching control circuit generates a fourth on signal for turning on said fourth transistor switch and a fourth off signal for turning off said fourth transistor switch, as said fourth switching signal,
   said first switching control circuit generates a first on signal for turning on said first transistor switch and a first off signal for turning off said first transistor switch, as said first switching signal, and said third switching control circuit generates a third on signal for turning on said third transistor switch and a third off signal for turning off said third transistor switch, as said third switching signal,
   wherein said first switching control circuit comprises a first logic circuit, said first logic circuit receives said second off signal and said fourth on signal, performs an AND operation, and generates said first on signal; and said first logic circuit receives said second on signal and said fourth off signal, performs an OR operation, and generates said first off signal; said third switching control circuit comprises a third logic circuit, said third logic circuit receives said second on signal and said fourth off signal, performs an AND operation, and generates said third on signal; said third logic circuit receives said second off signal and said fourth on signal, performs an OR operation, and generates said third off signal.

2. The synchronous rectification circuit according to claim 1, wherein said first transistor switch and said second transistor switch are connected in series between said first output terminal and said second output terminal, and said third transistor switch and said fourth transistor switch are connected in series between said first output terminal and said second output terminal.

3. The synchronous rectification circuit according to claim 1, wherein said second switching signal is generated in accordance with a second voltage at said second input terminal, and said fourth switching signal is generated in accordance with a first voltage at said first input terminal.

4. The synchronous rectification circuit according to claim 3, wherein
   said second switching control circuit comprises a first voltage judgment circuit and a second logic circuit, in which said first voltage judgment circuit receives said second voltage, compares said second voltage with a first threshold voltage and a second threshold voltage respectively, and generates a first comparison signal and a second comparison signal, said second logic circuit receives said first comparison signal, said second comparison signal and a dead time signal, generates said second on signal in a case that said second voltage is less than said first threshold voltage and said dead time signal is active, and said second off signal in a case that said second voltage is larger than said second threshold voltage;

said fourth switching control circuit comprises a second voltage judgment circuit and a fourth logic circuit, in which said second voltage judgment circuit receives said first voltage, compares said first voltage with a third threshold voltage and a fourth threshold voltage respectively, and generates a third comparison signal and a fourth comparison signal, and said fourth logic circuit receives said third comparison signal, said fourth comparison signal and said dead time signal, generates said fourth on signal in a case that said first voltage is less than said third threshold voltage and said dead time signal is active, and said fourth off signal in a case that said first voltage is larger than said fourth threshold voltage.

5. The synchronous rectification circuit according to claim 4, wherein said dead time signal represents a time interval during which both said second transistor switch and said fourth transistor switch are inactive.

6. The synchronous rectification circuit according to claim 1, wherein said first to fourth transistor switches and said switching control circuit are integrated into a single integrated chip.

7. The synchronous rectification circuit according to claim 6, wherein said integrated chip comprises four pins for being coupled to peripheral circuits, including two input pins and two output pins.

8. A switching power supply, comprising a power stage and said synchronous rectification circuit according to claim 1.

9. The synchronous rectification circuit according to claim 1, wherein said rectifier bridge converts an AC input voltage between a first input terminal and a second input terminal into a pulsed DC output voltage between a first output terminal and a second output terminal.

* * * * *